United States Patent
Hall

[15] 3,670,428
[45] June 20, 1972

[54] CLOCK SCALE DEMONSTRATOR

[72] Inventor: Maurice B. Hall, Boulder, Colo.

[73] Assignees: Harold F. Bowling, Ft. Collins; Edward E. Gitlin, Longmont, Colo.

[22] Filed: Dec. 28, 1970

[21] Appl. No.: 101,506

[52] U.S. Cl. ................................................. 35/39
[51] Int. Cl. ........................................... G09b 19/12
[58] Field of Search ............... 35/39, 31 A; 58/85.5, 106, 58/126 D

[56] References Cited

UNITED STATES PATENTS

| | | | |
|---|---|---|---|
| 2,997,794 | 8/1961 | Burr | 35/39 |
| 2,635,357 | 4/1953 | Whitlock | 35/39 |

Primary Examiner—Wm. H. Grieb
Attorney—Drake and Crandell

[57] ABSTRACT

A clock scale demonstrator especially useful for teaching children to tell time. Separable hour and minute dials, each having a manually movable hand, enable the instructor to demonstrate and explain hour and minute readings separately. The two dials may be mounted in aligned superposed relationship with each other to demonstrate how the two individual readings are then combined with each other, one of the dials being constructed of a transparent material so that the scale and hand of the second dial can be observed when the two dials are superposed.

6 Claims, 4 Drawing Figures

MAURICE B. HALL
INVENTOR

BY Drake and Crandell
Attorneys

CLOCK SCALE DEMONSTRATOR

BACKGROUND OF THE INVENTION

The process of teaching children to tell time is usually undertaken while the child is still at an age when his attention span is relatively short. Entirely apart from the fact that telling time is usually the child's first experience in reading a dial or scale, the child is faced with the problem that on conventional clocks, a single scale is provided where the numbers mean one thing when one hand points to them and another thing when the second hand points to them. Confronted with this problem, most children find it difficult to progress beyond the point of identifying the numbers to which the "big" and "little" hands are pointing.

The present invention is directed toward simplifying the learning process by demonstrating the use of the hour and minute scales separately in a manner such that they can subsequently be combined in a manner making it readily apparent to the child how the combined reading is achieved.

SUMMARY OF THE INVENTION

In accordance with the present invention, hour and minute dials are constructed in a manner such that they can be separated or placed in conventional superposed relationships to each other. Both dials are provided with a manually rotatable hand which can be set by the instructor or student to a selected hour or minute reading. The student is first taught to read the hour dial by demonstration, and the process is then repeated with the minute dial. In the next step, the hour and minute dials are placed side by side and the student is taught to read them consecutively, e.g. "4:45". In the next step, the dials are superposed and the student is asked to give the combined reading. If difficulty is encountered, the dials are separated as in the previous step, read by the student and then superposed with the hands in the same position. Each of the progressive steps outlined above is simple enough to be mastered within the attention span of most children.

In order to enable the combined reading of the two dials, the minute dial is constructed to overlie the hour dial and hand when the two dials are superposed, the minute dial being constructed of a transparent material so that the hour dial and hand can be readily seen with the minute dial in place.

Other features and objects of the present invention will be apparent by reference to the following specification and to the drawings.

IN THE DRAWINGS

Figure 2:
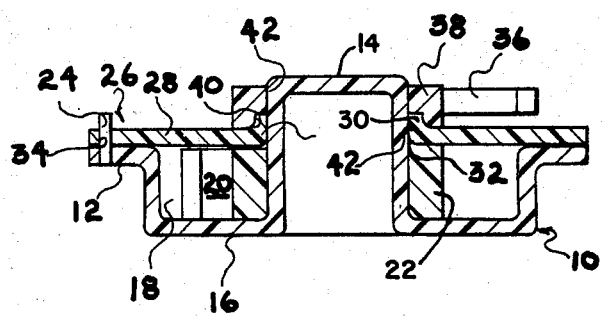
FIG. 2 is a cross-sectional view of the demonstrator of FIG. 1 taken on line 2—2 of FIG. 1.
Figure 3:
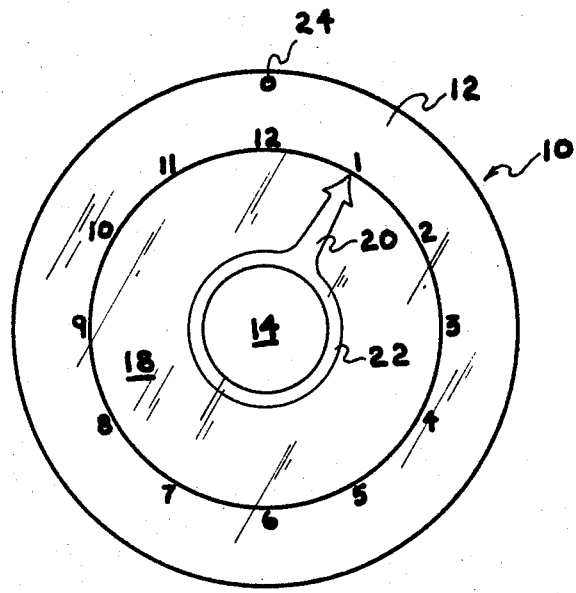
FIG. 3 is a front view of the hour hand and dial of the demonstrator of FIG. 1.

Referring first to FIGS. 2 and 3, an hour dial designated generally 10 is formed with a flat annular rim 12 which is integrally joined to a central hub 14 by an annular web 16 which, as best seen in FIG. 2, provides an annular recess 18 between the inner periphery of rim 12 and hub 14. Hour dial 10, as best seen in FIG. 3, is provided with an hour scale, the scale number preferably being located upon rim 12 closely adjacent the inner periphery of the rim. An hour hand 20 is formed integrally with and projects radially from an annular sleeve 22. The sleeve and hand 22, 20 and hour dial 10 are preferably formed from a molded plastic material with hub 14 and sleeve 22 being dimensioned so that a frictional fit is achieved between the sleeve and hub such that hand 20 will be held in any position to which it has been manually rotated.

As best seen in the cross-sectional view of FIG. 2, the axial dimension of hand 20 and sleeve 22 is such that the hand and sleeve are rotatably mounted on hub 14 within recess 18. A locating pin 24 is fixedly mounted on rim 12 to project forwardly from the scale face of rim 12.

Figure 1:
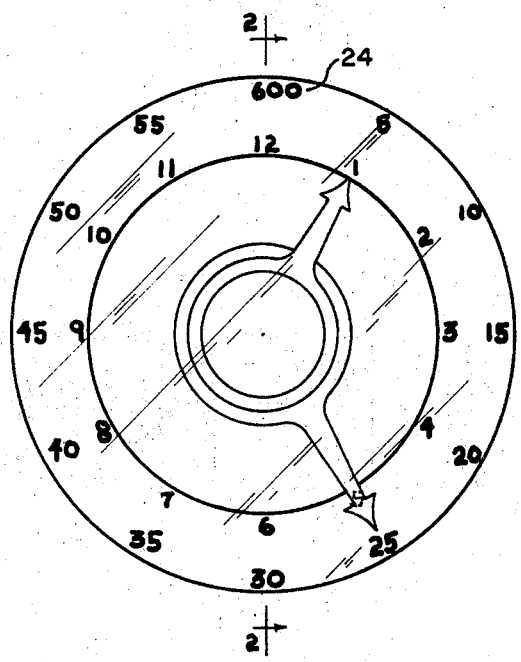
FIG. 1 is a front view of a clock scale demonstrator embodying the present invention showing the two dials in superposed relationship.
Figure 4:
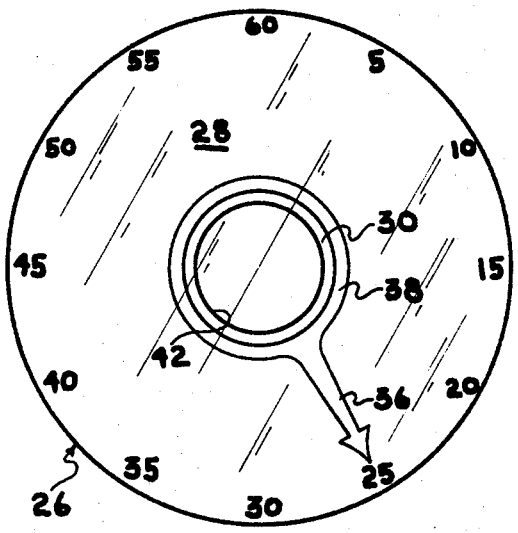
FIG. 4 is a front view of the minute dial and hand of the demonstrator of FIG. 1.

Referring now to FIGS. 2 and 4, a minute dial designated generally 26 is formed of a transparent plastic material with a circular dial face 28 and an integral central hub 30 which projects axially forwardly from face 28. Hub 30 is formed with a central opening 32 of a diameter slightly greater than the outside diameter of hub 14 of hour dial 10. A minute scale is provided on the face of dial 26, preferably at a location closely adjacent the outer periphery of dial face 28 so that, when minute dial 26 is superposed on hour dial 10, as shown in FIG. 1, the numbers of the minute scale are located radially outwardly of those of the hour scale. A bore 34 in minute dial 26 receives locating pin 24 on hour dial 10 to rotatively align the two dials when in the superposed position of FIGS. 1 and 2.

A minute hand 36 is formed with an integral sleeve 38. The central opening of sleeve 38 is formed with a stepped bore, having a large diameter section 40 dimensioned to be frictionally received upon hub 30 of minute scale 26 and a small diameter section 42 which is dimensioned to be, in a manner to be described below, frictionally engaged upon hub 14 of hour scale 10. As was the case with sleeve 22 and hub 14, the frictional engagement between hub 30 and large diameter section 40 of sleeve 38 is such that the sleeve is frictionally maintained on hub 30 at any position to which it has been manually rotated.

The demonstrator is used as follows. Referring first to FIG. 3, the hour dial and hand assembly alone are first shown to the student and the student is taught to read the hour by identifying the number to which the instructor causes hand 20 to be pointed. The student is then given the hour dial and asked by the instructor to move hand 20 to the 1 o'clock, etc. positions.

After the student has mastered the reading and manipulation of the hour dial, the process is repeated, using the minute dial and minute hand assembly 26, 36 by itself, entirely apart from the hour dial.

After reading of the minute dial has been mastered, the hour dial and minute dial are placed before the student side by side, but separated, and the student is taught to read the two separated dials consecutively—i.e., 1:25.

Once the student has mastered reading the separate dials consecutively, the dials are superposed in the manner shown in FIGS. 1 and 2 and the student is asked to read them in their superposed position. If difficulty is encountered at this point, the dials are separated, placed side by side and the previous step is repeated. The transparent minute dial enables the hour dial and hand to be read easily when the dials are in their superposed position.

As a final step in the teaching process, the minute hand and sleeve 36, 38 are removed from the minute scale and mounted on hub 14 directly to duplicate a conventional clock face. In this final step, only the hour scale is available to the pupil who by this time hopefully has memorized the correlation between the minute scale and hour scale.

It is believed apparent from the foregoing description that the demonstrator of the present invention enables the process of teaching a child to tell time to proceed in a logical step by step process in which each step is of such a simple nature that the time required to comprehend it is well within the child's attention span.

While one embodiment of the invention has been disclosed, it will be apparent to those skilled in the art that the disclosed embodiment may be modified. Therefore, the foregoing description is to be considered examplary rather than limiting and the true scope of the invention is that defined in the following claims.

I claim:

1. A clock scale demonstrator comprising separable first and second dials, said first dial having a minute scale around its periphery, a minute hand mounted on said first dial for manual rotation to indicate a selected reading on said minute scale, said second dial having an hour scale, an hour hand mounted upon said second dial for manual rotation to indicate a selected reading on said hour scale, means for detachably mounting one of said dials in angularly aligned coaxially superposed relationship upon the other dial, said one of said dials being of a transparent material to enable the scale and hand on the other of said dials to be observed therethrough when said dials are in said superposed relationship.

2. A demonstrator as defined in claim 1 wherein said other of said dials is formed with an axially projecting central hub, said one of said dials having a central opening therethrough adapted to receive said hub and to thereby constitute a part of said mounting means coaxially aligning said dials with each other, and means for angularly aligning said dials with each other.

3. A demonstrator as defined in claim 2 wherein said one of said dials comprises an axially projecting sleeve surrounding said opening, the hand on said one of said dials having an annular collar detachably mounted upon said sleeve for rotation thereon, means defining a central opening in said collar adapted to frictionally receive said hub to accommodate concurrent mounting of both of said hands upon the other of said dials.

4. A clock scale demonstrator comprising an annular hour dial having an axially extending central hub, an annular hour scale portion concentric with said hub and spaced radially outwardly therefrom, an integral web interconnecting said hub and said scale and defining an annular recess between said hub and said hour scale, hour scale indicia on said hour scale portion, an hour hand having an annular sleeve frictionally received on said hub for manual rotation on said hub to selected hour indicating portions within said recess, a minute dial comprising an annular disc having a central opening therethrough adapted to receive said hub to axially align said hour and minute dials when said minute dial is placed in overlying relationship to said hour dial, means for angularly aligning said dials with each other, minute scale indicia on said minute dial adjacent the outer periphery of said disc and a minute hand mounted upon said minute dial for manual rotation to selected minute indicating positions.

5. A demonstrator as defined in claim 4 further comprising first means for detachably mounting said minute hand on said minute dial and second means for detachably mounting said minute hand on said hub.

6. A demonstrator as defined in claim 4 wherein said hour scale indicia are located radially inwardly of said minute scale indicia when said minute dial is located in overlying relationship to said hour dial.

* * * * *